United States Patent
Lasalle et al.

(10) Patent No.: US 7,210,314 B2
(45) Date of Patent: May 1, 2007

(54) FIBERIZER THERMOCOUPLE SUPPORT FRAME

(75) Inventors: Michael Lasalle, Collegeville, PA (US); Thomas Cuthbertson, Royersford, PA (US)

(73) Assignee: Certainteed Corporation, Valley Forge, PA (US)

( * ) Notice: Subject to any disclaimer, the term of this patent is extended or adjusted under 35 U.S.C. 154(b) by 239 days.

(21) Appl. No.: 10/703,349

(22) Filed: Nov. 7, 2003

(65) Prior Publication Data

US 2005/0098670 A1 May 12, 2005

(51) Int. Cl.
*C03B 37/07* (2006.01)

(52) U.S. Cl. .............................. 65/384; 65/460; 65/461; 65/469

(58) Field of Classification Search ................... 65/377, 65/384, 488, 484, 469–471, 455–461, 521–523, 65/516–518
See application file for complete search history.

(56) References Cited

U.S. PATENT DOCUMENTS

| 3,117,556 | A | * | 1/1964 | Bowlus ....................... 122/4 R |
| 3,395,005 | A | * | 7/1968 | Stelmah ........................ 65/460 |
| 3,531,255 | A | * | 9/1970 | Fenske et al. ................. 436/55 |
| 3,582,281 | A | * | 6/1971 | Fenske et al. ............... 436/141 |
| 4,086,703 | A | | 5/1978 | Roberts |
| 4,201,247 | A | | 5/1980 | Shannon |
| 4,203,745 | A | | 5/1980 | Battigelli et al. |
| 4,263,034 | A | | 4/1981 | Sistermann et al. |
| 4,392,879 | A | * | 7/1983 | Takeuchi et al. .............. 65/384 |
| 4,652,126 | A | | 3/1987 | Mahooti |
| 4,718,930 | A | * | 1/1988 | Gartner et al. ................. 65/384 |
| 4,759,974 | A | | 7/1988 | Barthe et al. |
| 4,812,151 | A | * | 3/1989 | Sheinkop et al. .............. 65/384 |
| 5,259,857 | A | | 11/1993 | Pasquier et al. |
| 5,299,609 | A | | 4/1994 | Wedler |
| 5,474,590 | A | | 12/1995 | Lin |
| 5,554,324 | A | | 9/1996 | Bernard et al. |
| 5,826,983 | A | * | 10/1998 | Nakamura et al. ............ 374/14 |
| 6,170,298 | B1 | | 1/2001 | Skarzenski et al. |

FOREIGN PATENT DOCUMENTS

WO    WO 02/070417 A1    9/2002

* cited by examiner

*Primary Examiner*—Sean Vincent
(74) *Attorney, Agent, or Firm*—Duane Morris LLP

(57) ABSTRACT

An apparatus for positioning a sensor proximate to a fiberizer includes a support means for supporting a sensor, adjustment means for adjusting a position of the sensor, and attachment means for attaching the apparatus to a fiberizer. The adjustment means is coupled to the support means, and the attachment means is connected to the adjustment means.

14 Claims, 5 Drawing Sheets

FIBERIZER THERMOCOUPLE SUPPORT FRAME

FIELD OF THE INVENTION

The present invention relates to fiberizers for the manufacture of mineral fibers, and more particularly to a sensor support frame for assessing process conditions in a fiberizer.

BACKGROUND OF THE INVENTION

Insulating glass fibers are currently produced by internal centrifuging in a fiberizer, i.e., by introducing a thin stream of molten glass into a centrifuger, also known as a fiber spinner, rotating at high speed and having a large number of orifices on its sidewall. Under the effect of centrifugal force, the glass is projected through these orifices in the form of filaments. In addition to the centrifugal force, the fibers are often also drawn by a high temperature and velocity gaseous current, which is emitted tangentially to the perforated wall of the spinner by an annular burner. This gaseous current maintains the spinner sidewall at a temperature suitable for centrifuging the glass and also maintains the primary fibers emanating from the spinner in a plastic state to enable further attenuation into secondary fibers. Often, within the fiberizer, there is also an annular blower proximate to the sidewall of the spinner, which emits relatively cool air and serves to further attenuate the fibers.

Good fiber quality depends on several factors, e.g., the proper temperature in and around the spinner, the rotational speed of the spinner, the viscosity of the molten glass, and the air pressure around the spinner. These factors, in turn, depend on the proper operation of the spinner, the annular burner, and the blower. Thus, the fiber forming process is regulated by controlling the various process variables, such as the temperature and volume of the gaseous current from the annular burner, the temperature of air from the blower, the temperature and viscosity of the molten glass, and the rotation rate of the spinner, for example.

With respect to the temperature within and around the fiberizer, such temperature is sensitive to a large number of factors including, for example, the operation of the annular burner and the hot attenuating gases which are emitted from the burner to aid in drawing the fibers, the temperature of the glass, the flow rate of the glass, the relatively hot atmosphere prevailing around the spinner, the relatively intense cooling owing to the relatively high rotational velocity, the temperature of the air from the blower, and the spinner itself which may become deformed after a given amount of operating time and may consequently react differently to the effect of heating by the burners. Due to these various factors, there may be a fairly wide temperature gradient around the spinner to which the fibers are exposed during their formation.

Unsatisfactory temperatures may cause large-scale disturbance of the fiber-drawing process. If the spinner, for example, is too cold, devitrification may begin which renders the glass unsuitable for fiber-drawing. A spinner that is too hot and is at the thermal fracture limit may lead to the formation of undesirable non-fibered portions or extremely fine fibers due to the glass being too highly fluid.

The ability to accurately monitor and access the operating conditions, such as the temperature, in and around the spinner is thus crucial to regulating such operating conditions so that desirable fiber quality can be obtained or maintained. Values that fluctuate or deviate from the desirable values of pressure and temperature, for example, for the gaseous blast, diminish the quality of the fibers, produce waste and reduce the life of the spinner.

Certain prior art devices have been developed to monitor the temperature or other conditions of a fiberizer. For example, attempts have been made to position thermocouples or other process monitoring devices on the spinner or at fixed positions within the annular burner or in the path of the attenuating gases emerging from the annular burner. The fixed position of these devices only allows for a measurement at a specific location or measurements within a narrow range of locations. Generally, these devices fail to provide a broad picture of the processing conditions in the fiberizer.

There is a need for a means for more accurately and completely monitoring the operating conditions in fiberizers for use in determining and regulating the properties of fibers being produced, such as the diameter, length or the like, of such fibers. More particularly, there is a need for facilitating the measurement of different operating conditions, such as the gas temperature, gas pressure, spinner rotational speed, etc., the measured values being used for assessing, monitoring and regulating the operation of the fiberizer. Such a means may also allow for the attainment of an extended view of the environment that fibers face as they are formed at the spinner side wall, attenuated into primary and secondary fiber form, and distributed to a collection means either as chopped fibers or elongated filament strands.

SUMMARY OF THE INVENTION

According to one aspect, an apparatus for positioning a sensor proximate to a fiberizer comprises a support means for supporting a sensor, adjustment means for adjusting a position of the sensor, and attachment means for attaching the apparatus to a fiberizer. The adjustment means is coupled to the support means, and the attachment means is connected to the adjustment means. Preferably the location of the sensor can be adjusted at any time, even when the fiberizer is in operation.

The apparatus and method as described herein may advantageously be used to access and monitor operating conditions within a fiberizer. Unlike current methods that have a limited ability to measure one or more process conditions at certain specific locations, the present apparatus and method allow for a more expansive view of a variety of processing conditions, which may provide a more complete picture of the environment of fibers as they are formed by a fiberizer. Such an expansive view of the operating conditions may be employed to modify the process conditions to obtain higher quality product.

According to another aspect, an apparatus for positioning a sensor proximate to a fiberizer comprises a support for supporting a sensor, a first micrometer assembly for adjusting a position of the sensor, and a clamping mechanism for attaching the apparatus to a fiberizer. The clamping mechanism is coupled to the first micrometer assembly, and the first micrometer assembly is coupled to the support means.

According to another aspect, a system for monitoring a process condition of a fiberizer comprises a fiberizer, a support for supporting a sensor, a first micrometer assembly for adjusting a position of the sensor, and a clamping mechanism for attaching the support to the fiberizer. The micrometer assembly is coupled to the support means and the clamping mechanism is coupled to the first micrometer assembly.

According to a further aspect, a method of monitoring a process condition of a fiberizer comprises (a) providing a positioning apparatus having a support means for supporting a sensor, and at least one adjustment means for adjusting a position of the sensor, the adjustment means coupled to the support means, (b) attaching a sensor to the support means of the positioning apparatus, and (c) adjusting the position of the sensor with respect to the fiberizer by manipulating the adjustment means.

According to another aspect, a method for creating a temperature map of burner flame attenuation gases of a fiberizer comprises (a) providing a positioning apparatus having a support means and at least one adjustment means coupled to the support means, (b) attaching a thermocouple probe to the support means, (c) adjusting the position of the thermocouple probe with respect to attenuation gases of the fiberizer by manipulating the adjustment means, and (d) recording the temperature at a location in said attenuation gases.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
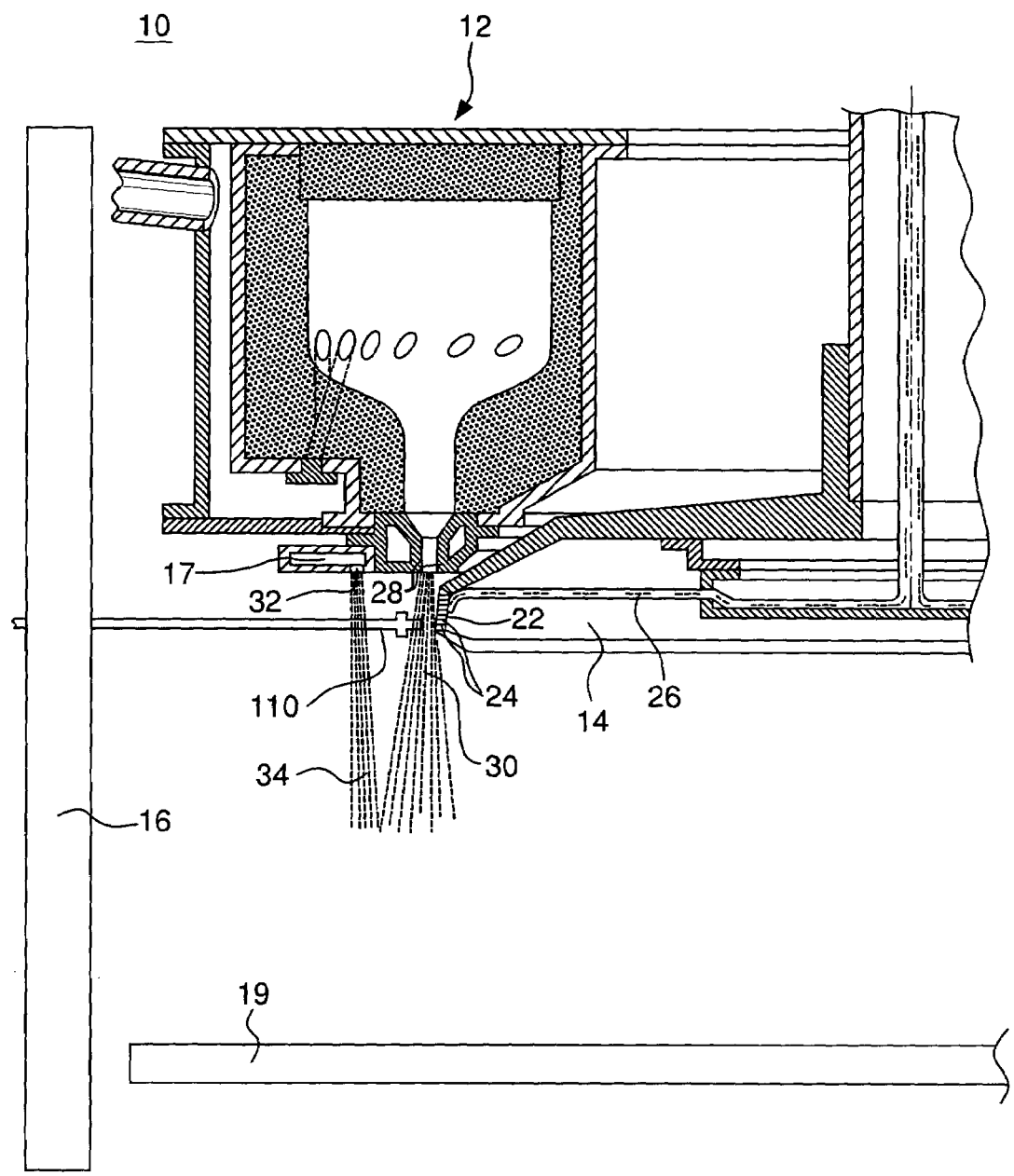
FIG. 1 is a partial cross-sectional side view of a fiberizer.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

FIG. 1 is a partial cross-sectional side view of a fiberizer 10. Fiberizer 10 comprises an annular burner 12, a spinner 14, a spinner guard 16, an annular blower 17, and a fiber collection means 19.

Figure 2A:
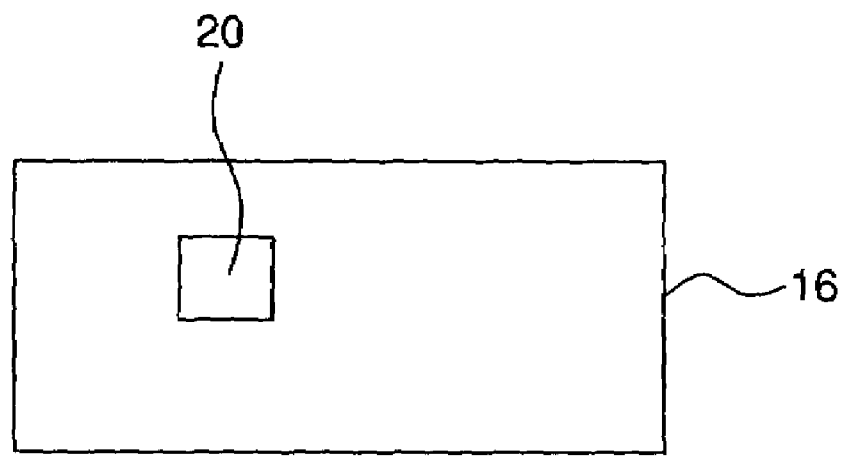
FIG. 2A is a front elevational view of one side of a spinner guard.
Figure 2B:
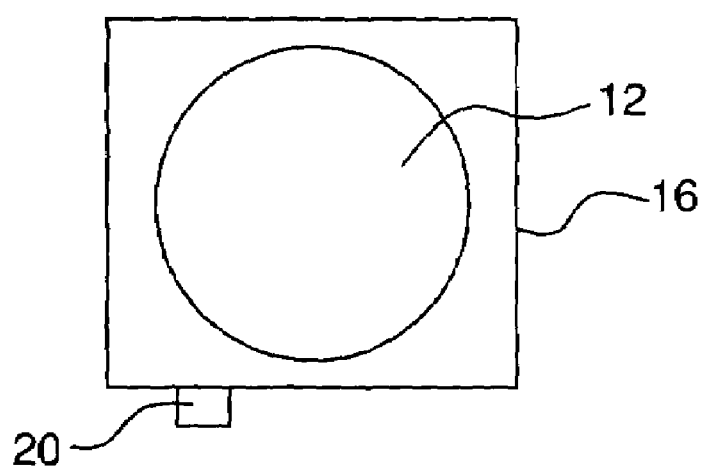
FIG. 2B is a top view of fiberizer with a spinner guard.

Referring to FIG. 2A, which is a front view of the spinner guard 16 of the fiberizer 10, and FIG. 2B, which is a top view of the fiberizer 10 with spinner guard 16, the spinner guard 16 includes at least one opening 20. As best shown in FIG. 2B, the opening 20 typically comprises a protrusion projecting from a wall of the spinner guard 16 and having an aperture therein. The spinner guard 16 is typically formed of sheets of ½ or ⅝ inch thick tempered aluminum and is employed as a protection device. The openings 20 in the spinner guard 16 are typically used for facilitating viewing of the annular burner 12 or spinner 14 of the fiberizer 10 by an operator.

Referring again to FIG. 1, spinner 14 includes a sidewall 22 which has a plurality of orifices 24 from which the molten material 26 emerges and is formed into primary fibers. The annular burner 12 includes discharge lips 28 from which a high velocity gas flow 30 emerges after being generated by a combustion chamber of the annular burner. The gas flow 30 encircles the sidewall 22 of the spinner 14 and acts to attenuate the fine threads of molten material that are emerging from the orifices 24. Annular blower 17 includes a discharge opening 32 from which an air stream 34 emerges to further aid in attenuating the fibers.

Figure 3:
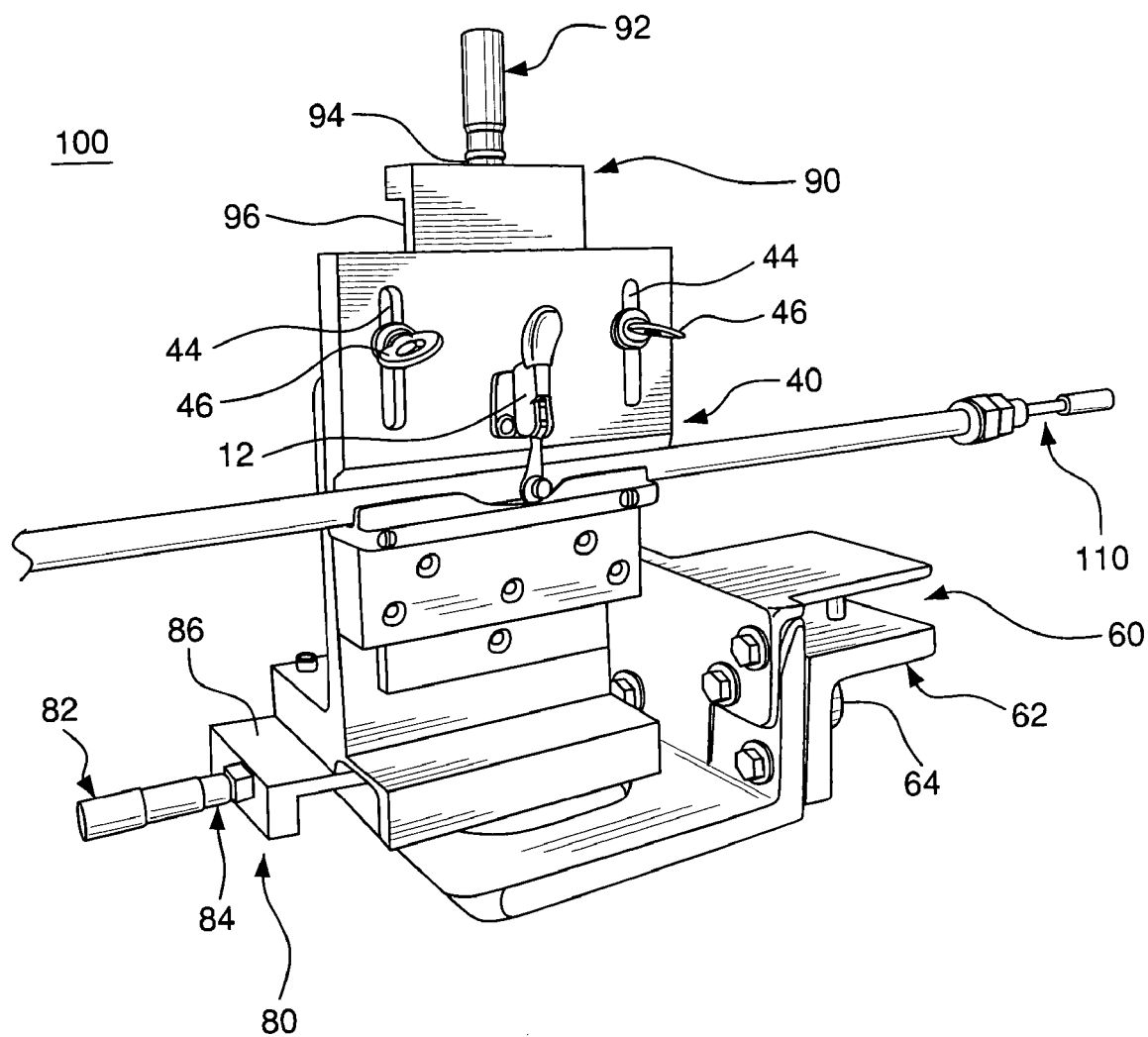
FIG. 3 is a perspective view of a first side of a positioning apparatus according to one aspect.
Figure 4:
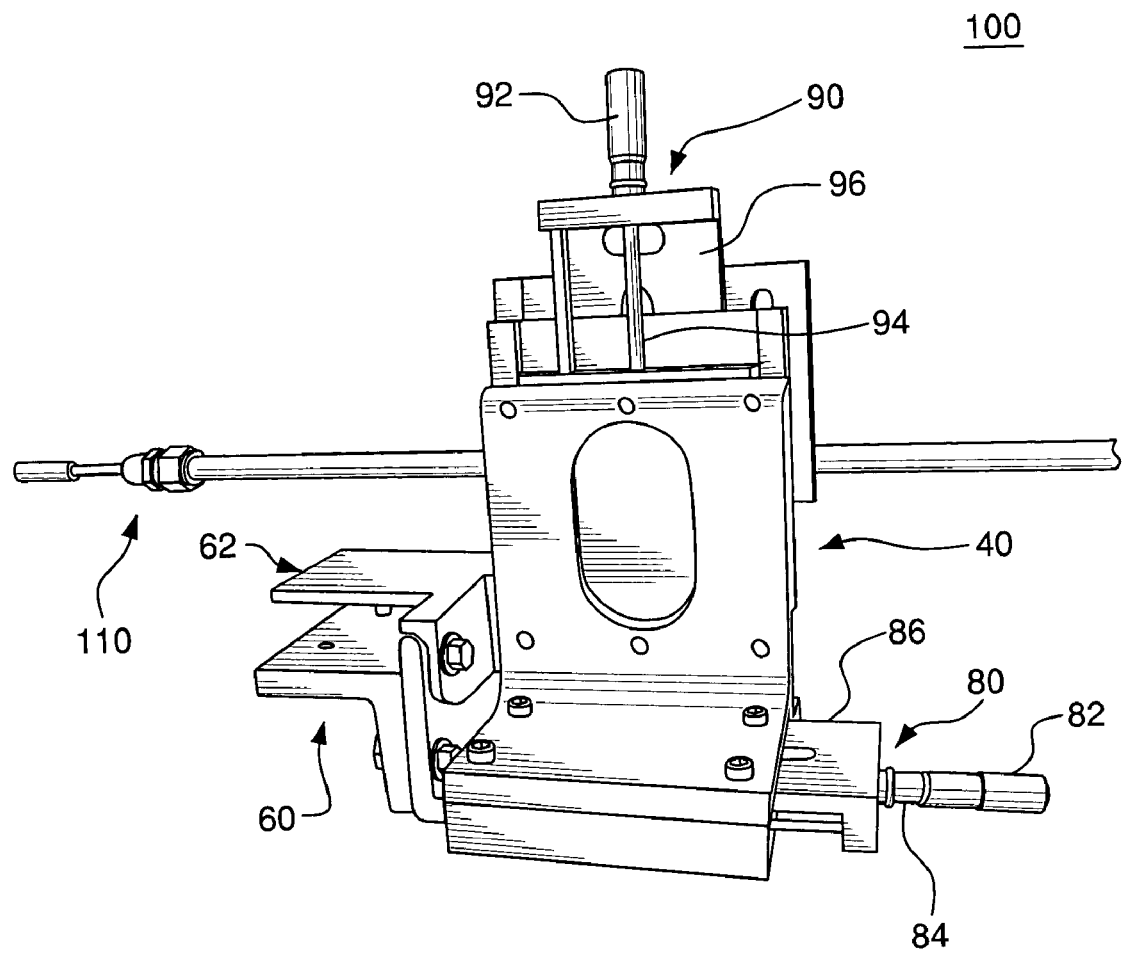
FIG. 4 is a perspective view of a second side of the positioning apparatus of FIG. 3.

Referring to FIGS. 3 and 4, a positioning apparatus 100 is shown comprising a support 40, a clamping mechanism 60, a first micrometer assembly 80, and a second micrometer assembly 90. The positioning apparatus 100 is shown supporting a thermocouple probe 110. The positioning apparatus 100 allows for variable positioning of the probe 110 at various locations proximate to the fiberizer 10. Although in a preferred embodiment, the positioning apparatus is employed to access and measure the temperature gradient in the area beneath the lips 28 of the annular burner 12 (as shown in FIG. 1), preferably within an area 2–5 millimeters from the sidewall 22 of the spinner 14, the positioning apparatus may be employed to measure the temperature, or any other process variable, in any area within or around the fiberizer.

The components of the positioning apparatus 100 may be formed of any material suitable for supporting and adjusting a sensor, such as thermocouple probe 110, however the components are preferably formed of metal, such as steel or aluminum, for example.

Figure 6:
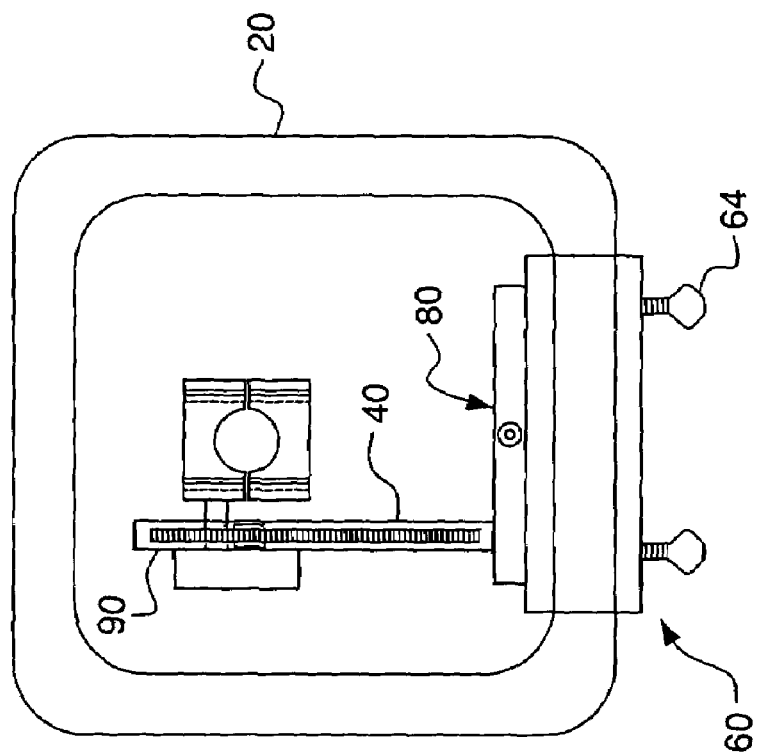
FIG. 6 is a rear view of the opening of a spinner guard with a positioning apparatus attached thereto.
Figure 5:
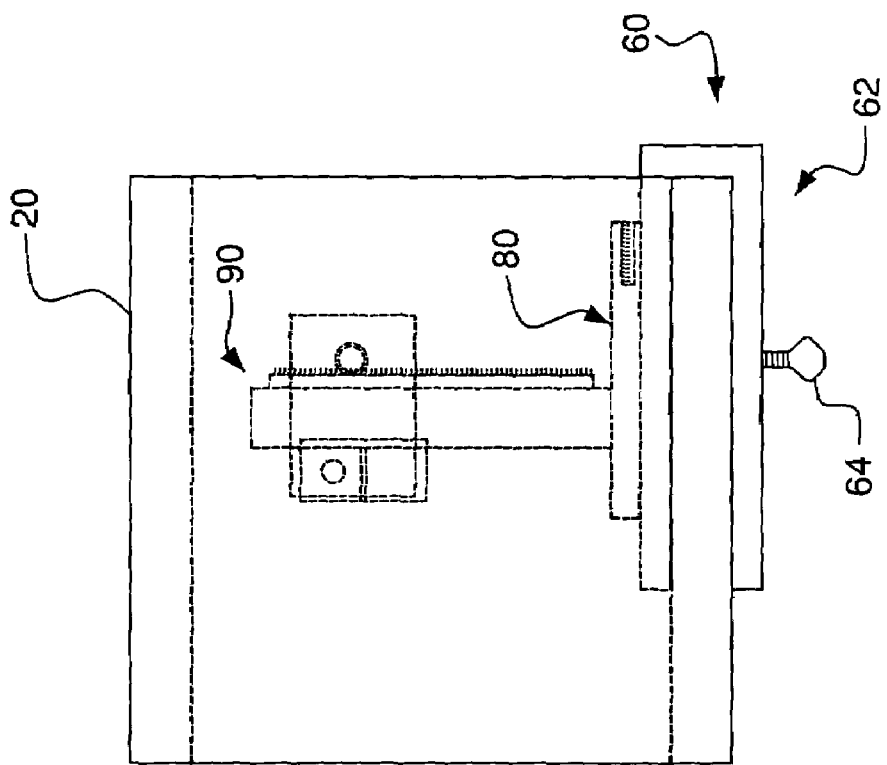
FIG. 5 is a side view of the opening of a spinner guard with a positioning apparatus attached thereto.

In one exemplary embodiment, clamping mechanism 60 includes a brace 62 and at least one fastener 64. Preferably the fasteners are screws, as best shown in FIGS. 5 and 6, for tightening the brace 62 onto the spinner guard 16 via the opening 20. However, the clamping mechanism may comprise any type of attachment mechanism that is capable of securing the positioning apparatus onto the fiberizer 10. Preferably the clamping mechanism 60 secures the positioning apparatus 100 to the spinner guard, but the clamping mechanism may also secure the positioning apparatus to other stable parts of the fiberizer 10, such as to the annular burner 12, or to stationary objects separate from, but proximate to the fiberizer. In an alternative embodiment, positioning apparatus 100 would not include a clamping mechanism, but rather the positioning apparatus would be self-supported without the need to be clamped to another object. In certain circumstances, it may be advantageous to create, vary the location of, or enlarge the opening 20 of the spinner guard 16 to allow for the positioning of a sensor at a greater number of locations.

Support 40, as exemplified in FIGS. 3 and 4, retains thermocouple probe 110 or other sensor). Preferably, support 40 includes a sensor release mechanism 42 for facilitating the insertion of the sensor into the support, the tightening of the sensor within the support, and removal of the sensor from the support. Support 40 may take any shape or form which allows the holding of the sensor. As more fully described below, the support 40 is adjustably coupled to at least one adjustment means for allowing positioning of a sensor, such as a thermocouple probe 110, proximate to the fiberizer 10. Preferably, as shown in FIG. 3, the support 40 further includes vertical adjustment apertures 44 and adjustment screws 46. The adjustment apertures 44 and adjustment screws 46 allow for an initial coarse adjustment of the vertical height of the sensor. The inclusion of such coarse vertical adjustment means advantageously allows an operator to set a starting point at any vertical level so that fine vertical adjustments can be made from such starting point without encountering the problem of reaching the limits of the vertically adjusting micrometer assembly. Thus, the vertical adjustment means allows the sensor to be positioned at the same point proximate the spinner 12 regardless of varying heights of different spinner guards or the location of the opening 20 on the spinner guard 16.

First micrometer assembly 80 is a horizontal adjusting micrometer assembly. It can adjust or move the support 40, and therefore the sensor retained by support 40, in an inward and outward direction. By "inward" it is meant that the sensor is moved towards the center of the fiberizer, and by "outward" it is meant that the sensor is moved away from the center of the fiberizer. First micrometer assembly 80 is adjustably coupled to support 40 to allow this movement. The first micrometer assembly 80 may comprise any known micrometer mechanism. Preferably, first micrometer assembly 80 includes a micrometer head 82, a micrometer rod 84, and a micrometer body 86. The body 86 is movably coupled to the support 40. The rod 84 is coupled to and preferably extends through or along the body 86, and is secured to the micrometer head 82. As the head 82 is rotated, the rod 84 moves incrementally in an inward or outward direction, which moves the body 86 in a respective inward or outward direction resulting in movement of the support 40 in the same inward or outward direction. The first micrometer assembly 80 may further include a locking mechanism to lock the micrometer assembly in a particular position. This locking mechanism would aid in preventing accidental rotation of the micrometer head 82 of the micrometer assembly 80.

Second micrometer assembly 90 is a vertical adjusting micrometer assembly. It can adjust or move the support 40, and therefore the sensor retained by support 40, in a substantially vertical, or up and down, direction. Second micrometer assembly 90 is adjustably coupled to support 40 to allow this movement. As stated above with respect to the first micrometer assembly 80, the second micrometer assembly 90 may comprise any known micrometer mechanism. Preferably, second micrometer assembly 90 includes a micrometer head 92, a micrometer rod 94, and a micrometer body 96. The body 96 is movably coupled to the support 40. The rod 94 is coupled to and preferably extends through or along the body 96, and is secured to the micrometer head 92. As the head 92 is rotated, the rod 94 moves incrementally in an up or down direction, which moves the body 96 in a respective vertical direction resulting in movement of the support 40 in the same vertical direction. The second micrometer assembly 90 may further include a locking mechanism to lock the micrometer assembly in a particular position.

Although not shown, the positioning apparatus 100 may include a third micrometer assembly which is capable of adjusting the support 40 and therefore the sensor retained by the support, in a sideways direction.

As stated above, in a preferred embodiment, the positioning apparatus 100 adjustably supports a thermocouple probe for sensing temperature within the fiberizer. However, in other embodiments the sensor may be, for example, a pressure sensor, e.g., a piezoelectric sensor for measuring the pressure of the attenuating gas employed in the fiberizer, a radiation sensor for measuring temperature, a volume sensor for measuring a volume of gas employed in the fiberizer, a viscosity sensor for measuring the viscosity of the molten material employed to make the fibers, a rotation sensor for measuring the rotation rate of the spinner, or a laminar flow sensor.

By employing the positioning apparatus 100, certain process conditions within the fiberizer can be monitored. Accordingly, a method for monitoring a process condition within a fiberizer comprises (a) providing a positioning apparatus having a support means for supporting a sensor, and at least one adjustment means for adjusting a position of the sensor, the adjustment means coupled to the support means, (b) attaching a sensor to the support means of the positioning apparatus, and (c) adjusting the position of the sensor with respect to the fiberizer by manipulating the adjustment means.

The method for monitoring preferably further comprises measuring a process condition within or around the fiberizer. In a highly preferred embodiment, the process condition being monitored is the temperature gradient proximate to the spinner sidewall. However, as stated above, various process conditions may be monitored by employing different types of sensors. The location of the sensor and thus the step of adjusting the position of the sensor may vary widely, including adjusting the sensor to be placed at locations from just below (or even within) the annular burner to just above the fiber collection means 19.

Preferably, the positioning apparatus includes an attachment means, and the method includes attaching the positioning apparatus to the fiberizer via the attachment means prior to adjusting the position of the sensor. In one preferred embodiment, the attachment means is attached to an opening 20 of the spinner guard 16. Such opening may be one pre-formed in the spinner guard 16 or may be cut into the spinner guard 16 to facilitate the desired positioning of the sensor. The sensor will be projected through the opening 20 into the area between the spinner guard 16 and annular burner 12 or spinner 14 of the fiberizer 10. Although preferably used in conjunction with openings 20 in a spinner guard 16 surrounding the fiberizer 10, the positioning apparatus 100 may be employed to position a sensor without the presence of a spinner guard or opening with which to insert the sensor.

Preferably the method and apparatus described herein are employed to measure process conditions in glass-fiber forming operations. However, such methods and apparatus may also be used to measure process conditions in the production of other thermoplastic materials such as rock, slag, and basalt.

In one preferred application of the positioning apparatus 100, the apparatus advantageously allows for the creation of a temperature map of the area at the discharge of the attenuating gasses. The map can be used to provide an enhanced understanding of the environment of the fibers as they are formed by the spinner 14 by providing a picture of the temperature gradient that the fibers flow through. In order to create the temperature map, the positioning apparatus 100 is employed to support a thermocouple probe 110 proximate to the fiberizer 10 by attaching the positioning apparatus to the fiberizer. The micrometer assemblies 80, 90 are used to make adjustments in the vertical and inward and outward directions of the support 40 and, therefore, the thermocouple probe 110 being retained by the support. Preferably, the apparatus 100 allows the thermocouple probe 110 to be positioned at multiple locations beneath the annular burner 12 (including within the discharge lips 28), and preferably proximate to the spinner sidewall 22, for monitoring the temperature at such multiple locations. By recording the relative position of the probe and the temperature at each position, a temperature map of the area beneath the annular burner 12 (including within discharge lips 28) and proximate to the spinner 14 may be created. The micrometer assemblies may be adjusted manually or may be coupled to a controller, such as a programmable computer, which automatically controls adjustment of the micrometer assemblies. Further, the information generated by the sensor may be collected and employed by a controller to direct process conditions as well as monitor such conditions. For example, if the thermocouple probe senses too high a temperature, the controller may be employed to direct a reduction in the burner flame.

In addition to one above-described preferred embodiment of creation of temperature map, the apparatus may also be used to create, for example, a pressure gradient map, a volume gradient map or viscosity gradient map. The positioning of the sensor by the positioning apparatus may vary greatly within, or proximate to, the fiberizer as necessary to monitor the specific characteristic being examined.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A method comprising the steps of:
   (a) providing a positioning apparatus having a support means for supporting a thermocouple probe, and at least one adjustment means for adjusting a translation of the thermocouple probe, the adjustment means coupled to the support means, wherein the adjustment means comprises a coarse translation adjustment means, a first micrometer assembly and a second micrometer assembly, and wherein the first micrometer assembly adjusts a horizontal translation of the thermocouple probe and the second micrometer assembly adjusts a vertical translation of the thermocouple probe;
   (b) attaching the thermocouple probe to the support means of the positioning apparatus, and
   (c) adjusting the translation of the thermocouple probe with respect to a fiberizer by manipulating the adjustment means.

2. The method of claim 1, wherein the positioning apparatus further includes an attachment means, and wherein the method further includes attaching the positioning apparatus to the fiberizer via the attachment means prior to adjusting the translation of the thermocouple probe.

3. The method of claim 1, wherein temperature is measured by translating the thermocouple probe to a plurality of locations in or proximate to the fiberizer to determine a temperature gradient thereof.

4. A method for creating a temperature map of burner flame attenuation gases of a fiberizer comprising:
   (a) providing a positioning apparatus having a support means and at least one adjustment means coupled to the support means, wherein the adjustment means comprises a coarse translation adjustment means, a first micrometer assembly and a second micrometer assembly, and wherein the first micrometer assembly adjusts a horizontal translation of a thermocouple probe and the second micrometer assembly adjusts a vertical translation of the thermocouple probe;
   (b) attaching the thermocouple probe to the support means,
   (c) adjusting a translation of the thermocouple probe with respect to attenuation gases of the fiberizer by manipulating the adjustment means, and
   (d) recording the temperature at a location in said attenuation gases.

5. The method of claim 4, wherein steps (c) and (d) are repeated to generate a temperature map of the attenuation gases of an annular burner of the fiberizer.

6. The method of claim 4, wherein the positioning apparatus further includes an attachment means, and wherein the method further includes attaching the positioning apparatus to the fiberizer via the attachment means prior to adjusting the translation of the thermocouple probe.

7. The method of claim 1, further comprising measuring one of the group consisting of gas pressure, glass viscosity, spinner rotation speed, and glass flow rate in the fiberizer.

8. The method of claim 1, further comprising adjusting the translation of the thermocouple probe while the fiberizer is in operation.

9. The method of claim 1, wherein step (c) includes adjusting the position of the thermocouple probe towards or away from a center of the fiberizer.

10. A method of monitoring a process condition of a fiberizer having a spinner, comprising:
    (a) a supporting thermocouple probe;
    (b) adjusting a translation of the thermocouple probe to a plurality of positions within or proximate to the fiberizer during operation of the fiberizer, using an adjustment means comprising coarse translation adjustment means, a first micrometer assembly and a second micrometer assembly, and wherein the first micrometer assembly adjusts a horizontal translation of a thermocouple probe and the second micrometer assembly adjusts a vertical translation of the thermocouple probe; and
    (c) monitoring one of the group consisting of gas temperature, glass temperature, fiberizer temperature, gas pressure, glass viscosity, rotation speed of the spinner and glass flow rate of the fiberizer at the plurality of positions.

11. The method of claim 10, further comprising generating a map of the monitored condition.

12. The method of claim 10, further comprising modifying the process condition based on the monitoring.

13. The method of claim 10, wherein the coarse adjustment means includes a plate portion having a plurality of adjustment apertures and adjustment screws.

14. The method of claim 10, wherein the monitoring step includes monitoring one of the group consisting of glass temperature, gas pressure, glass viscosity, rotation speed of the spinner and glass flow rate of the fiberizer at the plurality of positions.

* * * * *